United States Patent
Wolfe et al.

(10) Patent No.: US 6,583,367 B2
(45) Date of Patent: Jun. 24, 2003

(54) PARALLELOGRAM LOAD SENSING APPARATUS FOR A SEAT BELT WEBBING

(75) Inventors: George B. Wolfe, Plymouth, MI (US); Michael G. Fullerton, Ypsilanti, MI (US)

(73) Assignee: TRW Inc., Lyndhurst, OH (US)

( * ) Notice: Subject to any disclaimer, the term of this patent is extended or adjusted under 35 U.S.C. 154(b) by 125 days.

(21) Appl. No.: 09/861,127

(22) Filed: May 18, 2001

(65) Prior Publication Data

US 2002/0134590 A1 Sep. 26, 2002

Related U.S. Application Data

(63) Continuation-in-part of application No. 09/817,524, filed on Mar. 26, 2001.

(51) Int. Cl.$^7$ .............................................. G01G 19/08
(52) U.S. Cl. .................. 177/136; 177/210 R; 177/211; 177/229; 177/144; 73/862.391; 73/862.393; 73/862.637; 280/735; 280/801.1; 701/45; 180/273
(58) Field of Search ...................... 73/862.391, 862.632, 73/862.633, 862.634, 862.637, 862.638, 862.639, 862.393; 701/45; 177/211, 229, 136, 144, 210 R; 180/273; 280/73.5, 801.1

(56) References Cited

U.S. PATENT DOCUMENTS

| | | | |
|---|---|---|---|
| 3,462,731 A | 8/1969 | Gray | 340/457.1 |
| 3,504,336 A | 3/1970 | Boblitz | 340/457.1 |
| 3,713,333 A * | 1/1973 | MacGeorge | 177/210 R |
| 3,737,849 A | 6/1973 | Mead | 340/457.1 |
| 3,754,438 A * | 8/1973 | Matson | 73/862.634 |
| 4,657,097 A * | 4/1987 | Griffen | 177/211 |
| 4,785,673 A * | 11/1988 | Aumard | 73/862.632 |
| 5,222,398 A * | 6/1993 | O'Brien | 73/862.632 |
| 5,827,981 A * | 10/1998 | March | 73/862.642 |
| 5,906,393 A * | 5/1999 | Mazur et al. | 280/735 |
| 5,996,421 A | 12/1999 | Husby | 73/862.451 |
| 6,081,759 A | 6/2000 | Husby et al. | 701/45 |
| 6,087,598 A | 7/2000 | Munch | 177/144 |
| 6,230,088 B1 * | 5/2001 | Husby | 701/45 |
| 6,259,042 B1 * | 7/2001 | David | 177/136 |
| 6,311,571 B1 * | 11/2001 | Norton | 73/862.637 |
| 6,356,200 B1 | 3/2002 | Hamada et al. | 340/667 |
| 6,400,145 B1 * | 6/2002 | Chamings et al. | 280/735 |
| 6,405,607 B2 * | 6/2002 | Faigle et al. | 73/862.391 |
| 6,454,301 B1 | 9/2002 | Steffens, Jr. | 280/801.1 |

FOREIGN PATENT DOCUMENTS

DE 3942341 A1 * 6/1991 ............ 73/862.391

* cited by examiner

*Primary Examiner*—Randy W. Gibson
(74) *Attorney, Agent, or Firm*—Tarolli, Sundheim, Covell, & Tummino L.L.P.

(57) ABSTRACT

An apparatus (210) includes seat belt webbing (12), a parallelogram linkage (220), a sensor lever (370), and a sensor (379). The seat belt webbing (12) helps to protect the occupant (14) of the vehicle (18). The parallelogram linkage (220) includes a first beam (352) and a second beam (362) parallel to the first beam (352). The first and second beams (352, 362) each bend in response to at least part of a load applied by the seat belt webbing (12). The sensor lever (370) is interposed between the first and second beams (352). The sensor lever (370) has a connection with the first and second beams (352). The connection causes the sensor lever (370) to deflect upon bending of the first and second beams (352). The sensor (379) senses the deflection of the sensor lever (370) and provides an output signal indicative of the amount bending of the first and second beams (352, 362).

14 Claims, 5 Drawing Sheets

PARALLELOGRAM LOAD SENSING APPARATUS FOR A SEAT BELT WEBBING

This application is a continuation-in-part of Ser. No. 09/817,524 filed Mar. 26, 2001.

TECHNICAL FIELD

The present invention relates to an apparatus for sensing a load, and more particularly, to an apparatus for sensing a load applied by vehicle seat belt webbing.

BACKGROUND OF THE INVENTION

A conventional vehicle seat belt system restrains an occupant of a vehicle seat. The system includes seat belt webbing anchored to the floor pan of the vehicle, a tongue on the webbing, a seat belt buckle for receiving the tongue, and an apparatus for sensing the tension placed on the seat belt webbing by the occupant. An occupant weight sensor may be associated with the vehicle seat. The weight sensor provides an output signal that indicates a sensed weight of the occupant of the seat. An inflatable vehicle occupant protection device, such as an air bag, is inflated under the control of the weight sensor.

When the vehicle experiences a collision, a source of inflation fluid is actuated by a controller and directs inflation fluid into the inflatable vehicle occupant protection device. The controller receives an output signal from the weight sensor and controls the amount of inflation fluid directed into the inflatable vehicle occupant protection device in response to the output signal from the weight sensor. If the weight sensed by the weight sensor is below a predetermined amount (i.e., a low weight in the seat or no occupant in the seat), then the controller disables the source of inflation fluid to prevent inflation of the inflatable vehicle occupant protection device. The controller thus controls the fluid pressure in the inflatable vehicle occupant protection device and the restraining force provided by the inflatable vehicle occupant protection device based on the sensed weight of the occupant. The controller may also disable the inflatable vehicle occupant protection device.

The seat belt webbing, when buckled about an occupant, may be placed under tension. In this case, the weight sensor may not sense an accurate weight of the occupant. The seat belt tension sensing apparatus can produce an output signal that can be combined with the output signal from the weight sensor by the controller so that a more accurate weight value for the vehicle occupant is produced.

An apparatus that can determine the vertical component of the tension on the seat belt webbing and the angle at which that tension is applied can be utilized by the controller to more accurately determine the weight of the vehicle occupant. Also, such apparatus may determine the type of object in the vehicle seat, such as a child seat.

SUMMARY OF THE INVENTION

The present invention relates to an apparatus that includes seat belt webbing, a parallelogram linkage, a sensor lever, and a sensor. The seat belt webbing helps to protect the occupant of the vehicle. The parallelogram linkage includes a first beam and a second beam parallel to the first beam. The first and second beams each bend in response to a load applied by the seat belt webbing. The sensor lever is interposed between the first and second beams. The sensor lever has a connection with the first and second beams that causes the sensor lever to deflect upon bending of the first and second beams. The sensor senses the deflection of the sensor lever and provides an output signal indicative of the amount bending of the first and second beams and, therefore, the amount of load applied by the seat belt webbing.

BRIEF DESCRIPTION OF THE DRAWINGS

The foregoing and other features of the invention will become more apparent to one skilled in the art upon consideration of the following description of the invention and the accompanying drawings, in which.

DESCRIPTION OF THE PREFERRED EMBODIMENTS

Figure 1:
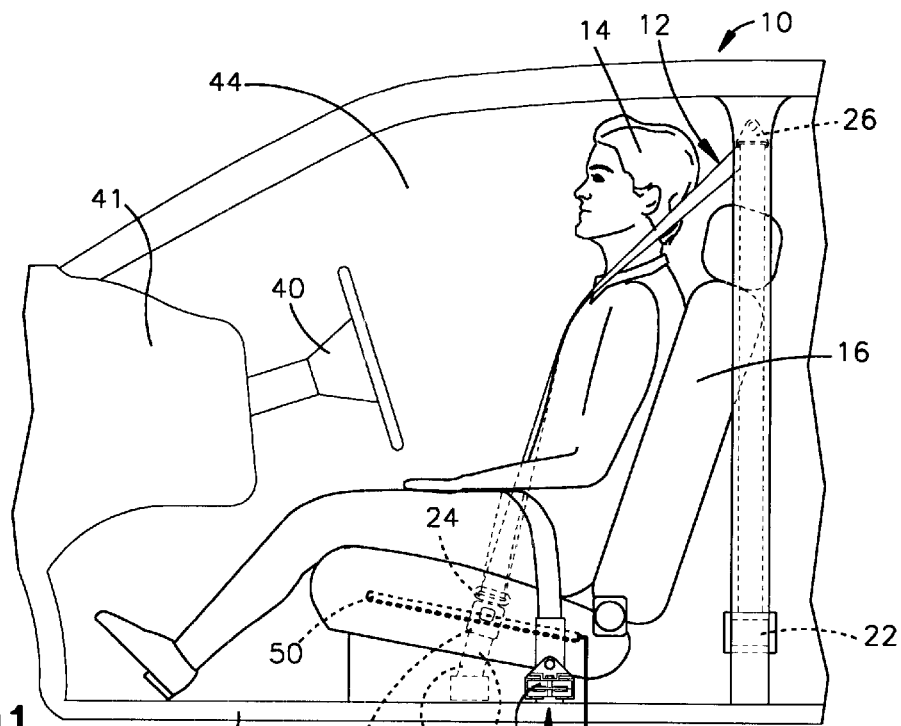
FIG. 1 is a schematic view of a seat belt system including an apparatus embodying the present invention.
Figure 2:
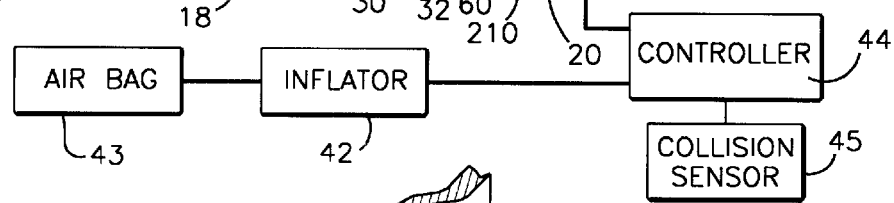
FIG. 2 is a schematic isometric view of the apparatus of FIG. 1 that is part of the seat belt system.
Figure 2:
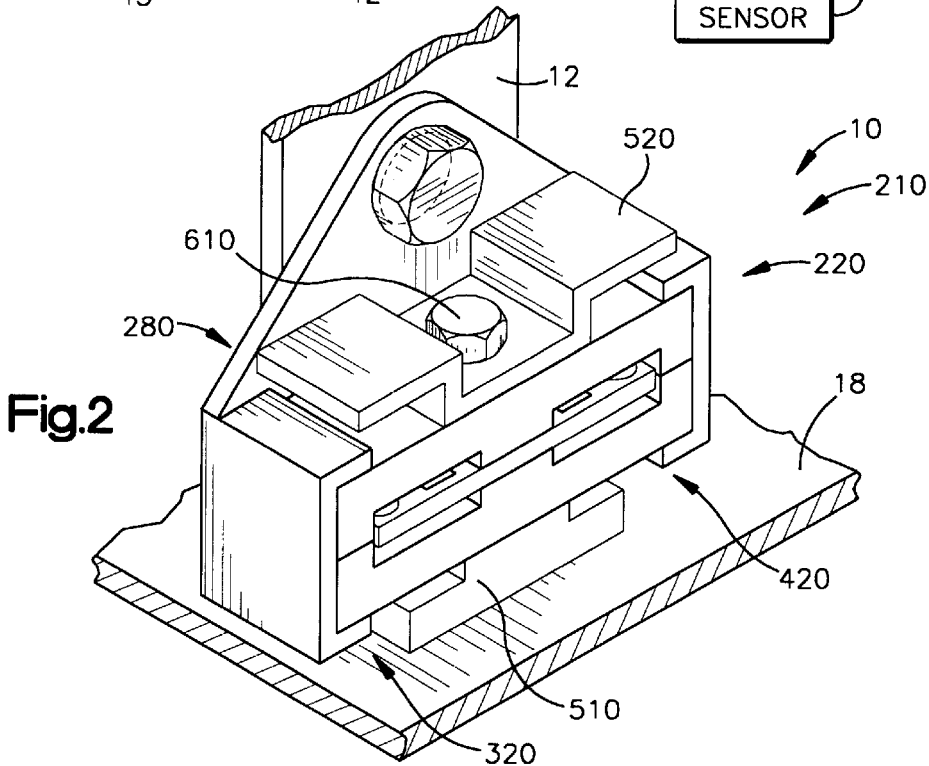

The present invention relates to a seat belt system for a vehicle. As illustrative of the present invention, a seat belt system 10 (FIG. 1) includes seat belt webbing 12 for restraining a vehicle occupant 14, in a driver's seat 16 in a vehicle 18. It is to be understood that the present invention could also be used with a seat belt system for restraining an object, such as a child safety seat or booster seat, in a front or rear passenger seat of the vehicle 18. The seat belt webbing 12 is extensible about the vehicle occupant 14. One end of the seat belt webbing 12 is anchored to the vehicle 18 at an anchor 20 located on one side of the vehicle seat 16. The opposite end of the seat belt webbing 12 is attached to a seat belt retractor 22 that is typically secured to the vehicle 18 on the same side of the vehicle seat 16 as the anchor 20.

As shown in FIG. 1 intermediate its ends, the seat belt webbing 12 passes through a tongue assembly 24 and a turning loop, or D-ring 26, which is located above the retractor 22 and the anchor point 20. When the seat belt webbing 12 is not in use, the seat belt webbing is wound on a spool of the retractor 22. The spool is biased in a direction to wind the webbing on the spool by a biasing spring, as is known. To use the seat belt webbing 12, the tongue assembly 24 is extended across the lap and torso of the vehicle occupant 14 and connected with a buckle 30. The buckle 30 is connected to the vehicle 18 by an anchor 32 on the opposite side of the vehicle seat 16 from the anchor 20 and the retractor 22.

An inflatable vehicle occupant protection device, such as an air bag 43, is stored in an uninflated condition in a portion of the vehicle 18, such as a steering wheel 40 or a dashboard 41 of the vehicle. When the vehicle 18 experiences a collision in which it is desirable to inflate the air bag 43, an inflator 42 is actuated and provides inflation fluid for inflating the air bag. The inflation fluid may be generated by combustion of pyrotechnic material, simply released from a pressurized container, or provided by a hybrid inflator, all as known in the art. The inflation fluid directed into the air bag 43 inflates the air bag from the uninflated condition to an inflated condition (not shown) in which the air bag extends into an occupant compartment 44 of the vehicle 18. The air bag 43 then helps to protect the vehicle occupant 14 from a forceful impact with a part of the vehicle 18 (i.e., the steering wheel 40, the dashboard 41, etc.).

An electronic controller 44, such as a microcomputer, is operatively connected to a known vehicle collision sensor 45. Once the controller 44 determines that a collision is occurring and that inflation of the air bag 43 is necessary to help protect the vehicle occupant 14 in the vehicle seat 16, the controller actuates the inflator 42, which is operatively connected to the controller. The amount of inflation fluid directed into the air bag 43 is controlled so that the air bag provides a cushioning and restraining force that is related to the weight of the vehicle occupant 14 in the vehicle seat 16.

A weight sensor 50 is mounted on or in the vehicle seat 16. The weight sensor 50 is operatively connected to the controller 44. The weight sensor 50 senses a weight of the vehicle occupant 14 or the object in the vehicle seat 16. The sensed weight may differ from the actual weight of the vehicle occupant 14 under differing conditions.

During normal operation of the vehicle 18, the vehicle occupant 14 usually has the tongue assembly 24 connected with the buckle 30. A tension on a lap belt portion of the seat belt webbing 12, including tension applied by the retractor 22, acts on the vehicle occupant 14. The tension in the lap belt portion of the seat belt webbing 12 pulls down at an angle on the vehicle occupant 14 (FIG. 1) causing the weight sensor 50 to be subjected to the weight of the vehicle occupant 14 along with a vertical component of downward force resulting from the tension in the lap belt portion of the seat belt webbing 12. The output signal from the weight sensor 50 thus indicates a sensed weight of the vehicle occupant 14 which may be greater than the actual weight of the vehicle occupant.

Additionally, during a vehicle collision, the vehicle occupant 14 may tend to move forward in the vehicle and produce a tension on the seat belt webbing 12. This tension in the seat belt webbing 12 may pull upward at an angle on the vehicle occupant 14 causing the weight sensor 50 to be subjected to less weight than the weight sensed during normal operation. The output signal from the weight sensor 50 thus indicates a sensed weight of the vehicle occupant 14 which may be less than the actual weight of the vehicle occupant.

An apparatus 210 for sensing a seat belt tension load senses the magnitude of the tension in the seat belt webbing 12 and the direction that the tension acts on the apparatus 210. The apparatus 210 provides two output signals: the first signal indicating the vertical component of the tension in the seat belt webbing 12 and the second signal indicating the direction of the tension. The output signals from the weight sensor 50 and the apparatus 210 are received by the controller 44.

During normal operation, the controller 44 determines a computed weight of the vehicle occupant 14 as a function of both the sensed weight and the vertical component of tension in the seat belt webbing 12. The sensed weight from-the weight sensor 50 differs from the actual weight of the vehicle occupant 14 by a first amount. The computed weight differs from the actual weight of the vehicle occupant 14 by a second amount that is less than the first amount and may be zero.

The controller 44 controls the amount of inflation fluid directed to the air bag 43 by the inflator 42 based on the computed weight of the vehicle occupant 14 in the vehicle seat 16. If the computed weight is below a predetermined value or zero (indicating the presence of a child seat in the seat or indicating the seat is not occupied), the controller 44 disables the inflator 42 to prevent inflation fluid from being directed to the air bag 43. Alternatively, if the computed weight is below the predetermined value, the controller 44 may cause the inflator 42 to direct a minimal amount of inflation fluid to the air bag 43.

The controller 44 may have in memory a look-up table of a plurality of empirical sensed weight values, a plurality of empirical vertical component of seat belt tension values, and a plurality of computed weight values corresponding to combining of the sensed weight values and the vertical component of tension values. The computed weight values stored in the look-up table could be predetermined empirically and/or through computations based on a predetermined functional relationship between the values of the sensed weight and the vertical component of tension.

The controller 44 can then identify a predetermined computed weight value corresponding to empirical values of the sensed weight and the vertical component of tension. Alternatively, the controller 44 could determine the computed weight by performing a computation based on a predetermined functional relationship between the sensed weight and the vertical component of tension that is derived from empirical data. One such functional relationship could be subtracting the vertical component of tension from the sensed weight (during normal vehicle operation). In either case, the computed weight determined by the controller 44 more closely approximates the actual weight of the vehicle occupant 14, as compared with the sensed weight indicated by the weight sensor 50, since the effect of the vertical component of tension in the seat belt webbing 12 is considered in determining the computed weight.

The controller 44 uses the output signal indicative of the direction of the tension in the seat belt webbing 12 to determine the size and shape of the object in the vehicle seat 16. The direction of tension indicates whether a child safety seat or booster seat is positioned in a front or rear passenger seat in the vehicle 18. A supplemental sensor of known type may also be used to sense the size and shape of the object in the seat to determine if a child safety seat or booster seat is positioned in the passenger seat.

If a child safety seat or booster seat is positioned in the seat, the tongue assembly 24 is connected with the buckle 30 to secure the child safety seat or booster seat to the seat. Typically, the seat belt webbing 12 is pulled as tight as possible to secure the child safety seat or booster seat to the seat. The tension in the seat belt webbing 12 pulls down on the child safety seat or booster seat causing the weight sensor 50 to be subjected to the weight of the child safety seat or booster seat with the child therein and the downward force resulting from the vertical component of tension in the seat belt webbing. The output signal from the weight sensor 50 thus indicates a sensed weight of the child safety seat or booster seat and the child therein which is greater than the actual weight of the child safety seat or booster seat and the child.

The apparatus 210 provides output signals indicative of the vertical component of tension in the seat belt webbing 12 and the direction of the tension. The controller 44 determines the computed weight of the child safety seat or booster seat and the child therein. If the weight sensor 50 senses that a child safety seat or booster seat is positioned in the seat, the controller 44 disables the source of inflation fluid to prevent inflation of the air bag 43. Alternatively, if the weight sensor 50 senses that a child safety seat or booster seat is positioned in the passenger seat, the controller 44 may cause the source of inflation fluid to direct a minimal amount of inflation fluid to the air bag 43.

The direction signal also is used to determine the presence of a child safety seat or booster seat in the seat. If the direction signal indicates that the seat belt webbing 12 is under tension at an angle relative to vertical less than a predetermined amount, the controller 44 will then determine that a child safety seat or booster seat is present. Typically such an angle is 45°.

The apparatus 210 includes a dual parallelogram linkage 220; a housing 280 for connection to the seat belt webbing 12; and a fixture block 510, for attaching the apparatus to the floor pan of the vehicle 18 at the anchor 20. The apparatus 210 further includes a restriction plate 520 for preventing over-travel of the dual parallelogram linkage 220; and a fastener assembly 610 for interconnecting the dual parallelogram linkage, the fixture block 510, and the restriction plate. The dual parallelogram linkage 220 includes a first parallelogram linkage 320 and a second parallelogram linkage 420 adjacent the first parallelogram linkage.

The first parallelogram linkage 320 defines a parallelogram in a vertical plane perpendicular to the floor pan of the vehicle 18 and parallel to the forward/rearward movement of the vehicle 18. The first parallelogram linkage 320 includes a first beam 352 and a second beam 362 extending parallel to the first beam. The first and second beams 352, 362 have adjacent, fixedly interconnected first ends 354, 364 that receive at least part of the load from the seat belt webbing 12. The first and second beams 352, 362 further have adjacent, fixedly interconnected second ends 356, 366 opposite the respective first ends 354, 364. Intermediate portions 355, 365 of the respective first and second beams 352, 362 interconnect the first ends 354, 364 and second ends 356, 366 of the first and second beams 352, 362, respectively. The second ends 356, 366 transmit at least part of the load from the seat belt webbing 12 to the floor pan of the vehicle 18.

The first and second beams 352, 362 are identical in construction and bend in response to a load applied to the beams. The first parallelogram linkage 320 further includes a first sensor lever 370 interposed between the intermediate portions 355, 365 and the second ends 356, 366 of the first and second beams 352, 362.

The intermediate portions 355, 365 of the first and second beams 352, 362 have smaller vertical dimensions than the ends 354, 356, 364, 366 of each beam 352, 362 (as viewed in FIGS. 2–6). The intermediate portions 355, 365 are vertically thinner than the ends 354, 356, 364, 366. The vertically larger ends 354, 356, 364, 366 and the intermediate portions 355, 365 of the beams 352, 362 create a closed parallelogram configuration (as viewed in FIGS. 2–6).

Figure 3:
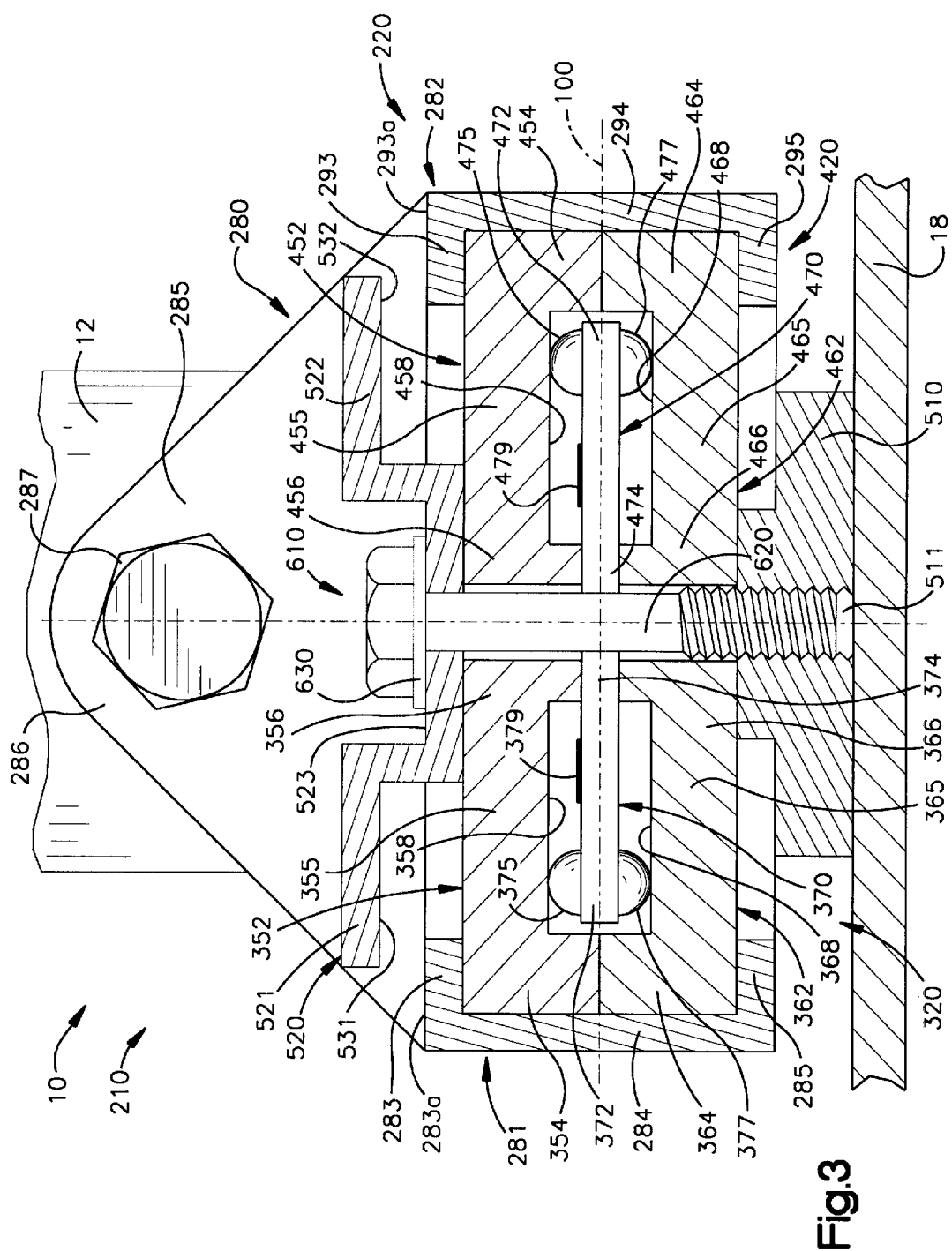
FIG. 3 is a schematic view of the apparatus of FIG. 2 under an unloaded condition.

The first sensor lever 370 has a longitudinal axis 100 in an unloaded, or unstressed, condition (as viewed in FIG. 3). The first and second beams 352, 362 are disposed above and below, respectively, the axis 100 of the first sensor lever 370 with the intermediate portions 355, 365 of the beams located at equal distances from the axis (as viewed in FIG. 3). The first sensor lever 370 further has a first end portion 372 and a second end portion 374 opposite the first end portion. The second end portion 374 of the first sensor lever 370 is interposed between, and has a fixed connection with, the second ends 356, 366 of the first and second beams 352, 362. The second end portion 374 of the first sensor lever 370 has an opening (not shown) for fixing the first sensor lever 370 in an interposed position between the second ends 356, 366 of the first and second beams 352, 362.

The first end portion 372 of the first sensor lever 370 is operatively associated with the intermediate portions 355, 365 of the first and second beams 352, 362. This arrangement causes the first sensor lever 370 to bend upon vertical movement of the first ends 354, 364 of the first and second beams 352, 362 (as viewed in FIGS. 4–6).

The first sensor lever 370 typically has a vertical thickness substantially less than that of each intermediate portion 355, 365 such that the stiffness of the first sensor lever is about one-tenth that of the combined stiffness of each intermediate portion. For example, if a ten-pound vertical load would deflect the first sensor lever 370 a predetermined amount, a one hundred pound vertical load would be required to deflect the two intermediate portions 355, 365 that same predetermined amount.

The first sensor lever 370 and the first and second beams 352, 362 are typically constructed of a suitable spring-like material such as steel or an engineered laminate. Aluminum may also be used entirely or in combination with steel or other suitable metal.

The first parallelogram linkage 320 further includes a first sensor 379 for sensing the bending of the first sensor lever 370 and for providing an output signal indicative of the amount of bending of the first sensor lever. The amount of bending of the first sensor lever 370 is directly related to the amount of bending of the first and second beams 352, 362. The first sensor 379 provides an output signal dependent upon the amount of bending of the first sensor lever 370. The first sensor 379 is typically a strain gauge sensor that is applied to the first end portion 372 of the first sensor lever 370, preferably by a silk-screening process.

The first end portion 372 of the first sensor lever 370 may be over-molded with a polymer (not shown) for environmentally sealing the first sensor 379 mounted thereon. The first end portion 372 of the first sensor lever 370 may then have a greater vertical thickness than the unsealed second end portion 374 of the first sensor lever 370.

The first end portion 372 of the first sensor lever 370 further includes an upper curved surface 375 and a lower curved surface 377. The upper curved surface 375 engages, or abuts, a lower surface 358 of the intermediate portion 355 of the first beam 352. The lower curved surface 377 engages, or abuts, an upper surface 368 of the intermediate portion 365 of the second beam 362. These curved surfaces 375, 377 may be portions of a sphere or some other suitably curved shape. The curved surfaces 375, 377 may also be curved end portions of fasteners, such as rivets, mounted on the first sensor lever 370 or on the upper and lower surfaces 358, 368 of the intermediate portions 355, 365 of the first and second beams 352, 362.

The first sensor lever 370 essentially bends only in a vertical plane about a horizontal axis (as viewed in FIGS. 4–6) when the load is applied to the apparatus 210. The lower and upper surfaces 358, 368 of the beams 352, 362 define spherical actuation points that will "roll" with the upper and lower curved surfaces 375, 377, respectively, if a torsional load, which tends to twist the first parallelogram linkage 320 about the axis 100, for example, is placed on the first parallelogram linkage. A lateral load on the first parallelogram linkage 320, transverse to the axis 100, is transferred through both beams 352, 362 from the seat belt webbing 12 to the floor pan of the vehicle 18. The first sensor lever 370, and the first sensor 379, thereby incur minimal torsional or lateral loading due to the spherical actuation points that allow minimal torsional deflection of the first sensor lever 370 as the first parallelogram linkage 320 is twisted about the axis 100.

The second parallelogram linkage 420 defines a parallelogram in a vertical plane perpendicular to the floor pan of the vehicle 18 and parallel to the forward/rearward movement of the vehicle 18. The second parallelogram linkage 420 includes a third beam 452 and a fourth beam 462 extending parallel to the third beam. The third and fourth beams 452, 462 have adjacent, fixedly interconnected first ends 454, 464 that receive part of the load from the seat belt webbing 12. The third and fourth beams 452, 462 further have adjacent, fixedly interconnected second ends 456, 466 opposite the respective first ends 454, 464. Intermediate portions 455, 465 of the respective third and fourth beams 452, 462 interconnect the first ends 454, 464 and second ends 456, 466 of the third and fourth beams 452, 462, respectively. The second ends 456, 466 transmit part of the load from the seat belt webbing 12 to the floor pan of the vehicle 18.

The third and fourth beams 452, 462 are identical in construction and bend in response to a load applied to the beams. The second parallelogram linkage 420 further includes a second sensor lever 470 interposed between the intermediate portions 455, 465 and the second ends 456, 466 of the third and fourth beams 452, 462.

The intermediate portions 455, 465 of the third and fourth beams 452, 462 have smaller vertical dimensions than the ends 454, 456, 464, 466 of each beam 452, 462 (as viewed in FIGS. 3–6). The intermediate portions 455, 465 are vertically thinner than the ends 454, 456, 464, 466. The vertically larger ends 454, 456, 464, 466 and the intermediate portions 455, 465 of the beams 452, 462 create a closed parallelogram configuration (as viewed in FIGS. 3–6).

The second sensor lever 470 has the same longitudinal axis 100 as the first sensor lever 370 in an unloaded, or unstressed, condition (as viewed in FIG. 3). The third and fourth beams 452, 462 are disposed above and below, respectively, the axis 100 of the second sensor lever 370 with the intermediate portions 455, 465 of the beams located at equal distances from the axis (as viewed in FIG. 3). The second sensor lever 470 further has a first end portion 472 and a second end portion 474 opposite the first end portion. The second end portion 474 of the second sensor lever 470 is interposed between, and has a fixed connection with, the second ends 456, 466 of the third and fourth beams 452, 462. The second end portion 474 of the second sensor lever 470 has an opening (not shown) for fixing the second sensor lever 470 in an interposed position between the second ends 456, 466 of the third and fourth beams 452, 462.

The first end portion 472 of the second sensor lever 470 is operatively associated with the intermediate portions 455, 465 of the third and fourth beams 452, 462. This arrangement causes the second sensor lever 470 to bend upon vertical movement of the first ends 454, 464 of the third and fourth beams 452, 462 (as viewed in FIGS. 4–6).

The second sensor lever 470 typically has a vertical thickness substantially less than that of each intermediate portion 455, 465 such that the stiffness of the second sensor lever is about one-tenth that of the combined stiffness of each intermediate portion. For example, if a ten-pound vertical load would deflect the second sensor lever 470 a predetermined amount, a one hundred pound vertical load would be required to deflect the two intermediate portions 455, 465 that same predetermined amount.

The second sensor lever 470 and the third and fourth beams 452, 462 are typically constructed of a suitable spring-like material such as steel or an engineered laminate. Aluminum may also be used entirely or in combination with steel or other suitable metal.

The second parallelogram linkage 420 further includes a second sensor 479 for sensing the bending of the second sensor lever 470 and for providing an output signal indicative of the amount of bending of the second sensor lever. The amount of bending of the second sensor lever 470 is directly related to the amount of bending of the third and fourth beams 452, 462. The second sensor 479 provides an output signal dependent upon the amount of bending of the second sensor lever 470. The second sensor 479 is typically a strain gauge sensor that is applied to the first end portion 472 of the second sensor lever 470, preferably by a silk-screening process.

The first end portion 472 of the second sensor lever 470 may be over-molded with a polymer (not shown) for environmentally sealing the second sensor 479 mounted thereon. The first end portion 472 of the second sensor lever 470 may then have a greater vertical thickness than the unsealed second end portion 474 of the second sensor lever 470.

The first end portion 472 of the second sensor lever 470 further includes an upper curved surface 475 and a lower curved surface 477. The upper curved surface 475 engages, or abuts, a lower surface 458 of the intermediate portion 455 of the third beam 452. The lower curved surface 477 engages, or abuts, an upper surface 468 of the intermediate portion 465 of the fourth beam 462. These curved surfaces 475, 477 may be portions of a sphere or some other suitably curved shape. The curved surfaces 475, 477 may also be curved end portions of fasteners, such as rivets, mounted on the second sensor lever 470 or on the upper and lower surfaces 458, 468 of the intermediate portions 455, 465 of the third and fourth beams 452, 462.

The second sensor lever 470 essentially bends only in a vertical plane about a horizontal axis (as viewed in FIGS. 4–6) when the load is applied to the apparatus 210. The lower and upper surfaces 458, 468 of the beams 452, 462 define spherical actuation points that will "roll" with the upper and lower curved surfaces 475, 477, respectively, if a torsional load, which tends to twist the second parallelogram linkage 420 about the axis 100, for example, is placed on the second parallelogram linkage. A lateral load on the second parallelogram linkage 420, transverse to the axis 100, is transferred through both beams 452, 462 from the seat belt webbing 12 to the vehicle floor pan 19. The second sensor lever 470, and the second sensor 479, thereby incur minimal torsional or lateral loading due to the spherical actuation points that allow minimal torsional deflection of the second sensor lever 470 as the second parallelogram linkage 420 is twisted about the axis 100.

The housing 280 is typically constructed of a suitable metal such as steel. The housing 280 has a first end portion 281 for fixed attachment to the first ends 354, 364 of the first and second beams 352, 362 and a second end portion 282 for fixed attachment to the first ends 454, 464 of the third and fourth beams 452, 462. The housing 280 is attached to the dual parallelogram linkage 220 such that no rotation can occur about any horizontal axis unless the entire housing rotates (i.e., no relative rotation).

The first end portion 281 of the housing 280 includes an upper horizontal portion 283, a lower horizontal portion 285, and a vertical intermediate portion 284 interconnecting the upper and lower portions. The second end portion 282 of the housing 280 includes an upper horizontal portion 293, a lower horizontal portion 295, and a vertical intermediate portion 294 interconnecting the upper and lower portions (as viewed in FIG. 3).

The housing further includes a vertical connection member 285 interconnecting the first end portion 281 and the second end portion 282. An upper part 286 of the connection member 285 has an opening 287 for attaching the seat belt webbing 12 to the housing 280. The upper part 286 directly receives the load from the seat belt webbing 12.

The fastener assembly 610 includes a fastener 620 and a washer, or fastener member 630. The fastener 620 may be a bolt with a head that clamps the fastener member 630 against an upper surface 523 of the restriction plate 520. As viewed in FIGS. 3–6, the shaft of the fastener 620 extends downward from the head through the fastener member 630, an opening in the restriction plate 520, an opening in the second ends 356, 456 of the first and third beams 352, 452, an opening in the second end portions 374, 474 of the first and second sensor levers 370, 470, an opening in the second ends 366, 466 of the second and fourth beams 362, 462, and into a threaded opening 511 in the fixture block 510. The fixture block 510 is fixed to the floor pan of the vehicle 18 by fastener, weld, or other suitable method (not shown).

The fastener 620, housing 280, and restriction plate 520 may be constructed of a suitable metal such as stainless steel. Other corrosion-resistant materials of sufficient strength may also be used.

The first beam 352 of the first parallelogram linkage 320 and the third beam 452 of the second parallelogram linkage 420 may be constructed as a single piece with the second ends 356, 456 comprising a middle portion with an opening for receiving the fastener 610 (as viewed in FIGS. 2–6). Similarly, the second beam 362 of the first parallelogram linkage 320 and the fourth beam 462 of the second parallelogram linkage 420 may be constructed as a single piece with the second ends 366, 466 comprising a middle portion with an opening for receiving the fastener 610 (as viewed in FIGS. 2–6). The first sensor lever 370 of the first parallelogram linkage 320 and the second sensor lever 470 of the second parallelogram linkage 420 also may be constructed as a single piece with the second end portions 374, 474 comprising a middle portion for receiving the fastener 610 (as viewed in FIGS. 2–6).

When a directly upward load (as viewed in FIG. 4) is placed on the seat belt webbing 12 and the housing 280, the load is transmitted through the first ends 354, 364 of the first and second beams 352, 362 and the first ends 454, 464 of the third and fourth beams 452, 462. Since the second ends 356, 366, 456, 466 of the first, second, third, and fourth beams 352, 362, 452, 462 are fixed to the floor pan of the vehicle 18 through the fixture block 510, the first ends 354, 364, 454, 464 of the first, second, third, and fourth beams 352, 362, 452, 462 will move upward with the housing 280. As the first ends 354, 364, 454, 464 move upward, the intermediate portions 355, 365, 455, 465 resiliently deflect upward (as viewed in FIG. 5).

The first, second, third, and fourth beams 352, 362, 452, 462 act as spring elements transferring the directly upward load from the seat belt webbing 12 to the floor pan of the vehicle 18. The thinner vertical dimensions of the intermediate portions 355, 365, 455, 465 of the first, second, third, and fourth beams 352, 362, 452, 462 facilitate upward deflection of the first ends 354, 364, 454, 464 of the beams while the second ends 356, 366, 456, 466 remain vertically fixed relative to the floor pan of the vehicle 18.

Because of the fixed attachment of the housing 280 to the first ends 354, 364, 454, 464 of the first, second, third, and fourth beams 352, 362, 452, 462, the housing is constrained to move mainly vertically (linearly upward) when directly upward force is applied to the housing. The housing 280 is constrained horizontally. The vertically deflected intermediate portions 355, 365, 455, 465 of the beams 352, 362, 452, 462 thereby assume "S" shapes (as viewed in FIG. 4).

When the controller 44 receives the signals from the first sensor 379 and the second sensor 479, the controller compares the signals and determines the direction (or angle) of the load by analyzing the difference (if any) between the magnitude of the signals. The controller 44 also determines the magnitude of the vertical component of the load by analyzing the signals. Adding the output from the two signals is one possible method for determining this magnitude.

When an upward and to the right load (as viewed in FIG. 5) is placed on the seat belt webbing 12 and the housing 280, the load is transmitted through the first ends 354, 364 of the first and second beams 352, 362 and the first ends 454, 464 of the third and fourth beams 452, 462. Since the second ends 356, 366, 456, 466 of the first, second, third, and fourth beams 352, 362, 452, 462 are fixed to the floor pan of the vehicle 18 through the fixture block 510, the first ends 354, 364, 454, 464 of the first, second, third, and fourth beams 352, 362, 452, 462 will move upward with the housing 280. As the first ends 354, 364, 454, 464 move upward, the intermediate portions 355, 365, 455, 465 resiliently deflect upward (as viewed in FIG. 5).

The first, second, third, and fourth beams 352, 362, 452, 462 act as spring elements transferring the upward, angled load from the seat belt webbing 12 to the floor pan of the vehicle 18. The thinner vertical dimensions of the intermediate portions 355, 365, 455, 465 of the first, second, third, and fourth beams 352, 362, 452, 462 facilitate upward deflection of the first ends 354, 364, 454, 464 of the beams while the second ends 356, 366, 456, 466 remain vertically fixed relative to the floor pan of the vehicle 18.

Because of the fixed attachment of the housing 280 to the first ends 354, 364, 454, 464 of the first, second, third, and fourth beams 352, 362, 452, 462, the housing is constrained to move mainly vertically (linearly upward) with a slight rotation when upward angled force is applied to the housing. The housing 280 is constrained horizontally. The vertically deflected intermediate portions 355, 365, 455, 465 of the beams 352, 362, 452, 462 thereby assume "S" shapes (as viewed in FIG. 5) with the first sensor lever 370 deflecting upward more than the second sensor lever 470.

When the controller 44 receives the signals from the first sensor 379 and the second sensor 479, the controller compares the signals and determines the direction (or angle) to the right of the load from a directly vertical load (FIG. 4) by analyzing the difference between the magnitude of the signals. The controller 44 also determines the magnitude of the vertical component of the load by analyzing the signals. Adding the output from the two signals is one possible method for determining this magnitude.

When an upward and to the left load (as viewed in FIG. 6) is placed on the seat belt webbing 12 and the housing 280, the load is transmitted through the first ends 354, 364 of the first and second beams 352, 362 and the first ends 454, 464 of the third and fourth beams 452, 462. Since the second ends 356, 366, 456, 466 of the first, second, third, and fourth beams 352, 362, 452, 462 are fixed to the floor pan of the vehicle 18 through the fixture block 510, the first ends 354, 364, 454, 464 of the first, second, third, and fourth beams 352, 362, 452, 462 will move upward with the housing 280. As the first ends 354, 364, 454, 464 move upward, the intermediate portions 355, 365, 455, 465 resiliently deflect upward (as viewed in FIG. 6).

The first, second, third, and fourth beams 352, 362, 452, 462 act as spring elements transferring the upward, angled load from the seat belt webbing 12 to the floor pan of the vehicle 18. The thinner vertical dimensions of the intermediate portions 355, 365, 455, 465 of the first, second, third, and fourth beams 352, 362, 452, 462 facilitate upward deflection of the first ends 354, 364, 454, 464 of the beams while the second ends 356, 366, 456, 466 remain vertically fixed relative to the floor pan of the vehicle 18.

Because of the fixed attachment of the housing 280 to the first ends 354, 364, 454, 464 of the first, second, third, and fourth beams 352, 362, 452, 462, the housing is constrained to move mainly vertically (linearly upward) with a slight rotation when upward angled force is applied to the housing. The housing 280 is constrained horizontally. The vertically deflected intermediate portions 355, 365, 455, 465 of the beams 352, 362, 452, 462 thereby assume "S" shapes (as viewed in FIG. 6) with the first sensor lever deflecting upward less than the second sensor lever 470.

When the controller 44 receives the signals from the first sensor 379 and the second sensor 479, the controller compares the signals and determines the direction (or angle) to the left of the load from a directly vertical load (FIG. 4) by analyzing the difference between the magnitude of the signals. The controller 44 also determines the magnitude of the vertical component of the load by analyzing the signals. Adding the output from the two signals is one possible method for determining this magnitude.

The dual parallelogram linkage 220 may receive cross-car forces that act transverse to the axis 100 of the first and second sensor levers 370, 470. Such forces may impart torsional forces about the axis 100 to the first, second, third, and fourth beams 352, 362, 452, 462, as discussed above. However, any rotation that is incurred by the dual parallelogram linkage 220 about the axis 100 will not significantly affect the spring rate, or stiffness, of the beams 352, 362, 452, 462 to vertical loading at the first ends 354, 364, 454, 464. The dual, identical beam configuration of the first and second parallelogram linkages 320, 420, with each beam 352, 362, 452, 462 identically associated with the axis 100, balances any rotation about the axis created by this torsional loading such that the effective moment of inertia of the beams about the axis remains unchanged even when the beams are under a deflected condition. For example, if torsional loading of the beams 352, 362, 452, 462 has occurred, tension or compression stresses induced in the first and third beams 352, 452 would be offset by equal and opposite tension and compression stresses induced in the second and fourth beams 362, 462.

Further, the first and third beams 352, 462, acting in tandem with the second and fourth beams 362, 462, balance any cross-sectional deformations of the beams that would alter the vertical spring rate (i.e., if only beams on one side of the axis 100 would be utilized, etc.). The torsional reaction of the dual beam configuration is thus equal about the axis 100, but opposite, and the vertical spring rate remains constant even after some deflection (and some cross-sectional deformation) has occurred.

The relationship, or spring rate, of the vertical load placed on the first ends 354, 364, 454, 464 of the beams 352, 362, 452, 462 by the seat belt webbing 12 and the housing 280 to the vertical displacement of the first ends of the beams is linear, constantly proportional, predictable, and consistent for differing amounts of upward travel of the first ends. Thus the output of the first and second sensors 379, 479 on the first and second sensor levers 370, 470 is also linear, constantly proportional, predictable, and consistent for both parallelogram linkages 320, 420.

The restriction plate 520 provides travel stops for the dual parallelogram linkage 220. The restriction plate 520 has a first end portion 521 and a second end portion 522 opposite the first end portion. A lower surface 531 of the first end portion 521 prevents the first end portion 281 of the housing 280 from moving upward more than a predetermined amount as an upper surface 283a of the first end portion 281 of the housing 280 engages the lower surface 531. A lower surface 532 of the second end portion 522 prevents the second end portion 282 of the housing 280 from moving upward more than a predetermined amount as an upper surface 293a of the second end portion 282 of the housing 280 engages the upper surface 532. The typical upward amount of travel permitted by these stops is 1.0 mm.

Figure 4:
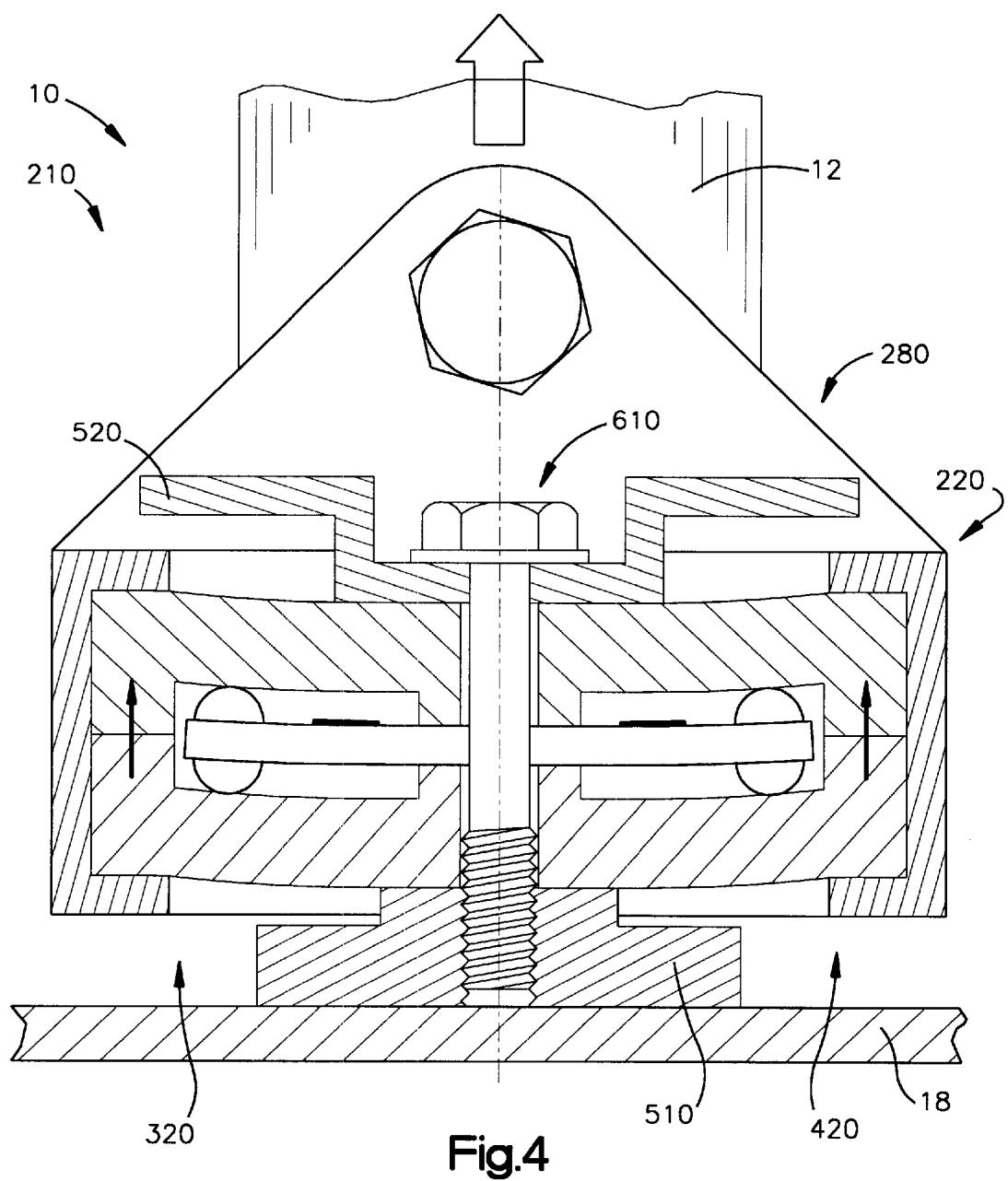
FIG. 4 is a schematic view of the apparatus of FIG. 2 under a loaded condition.
Figure 5:
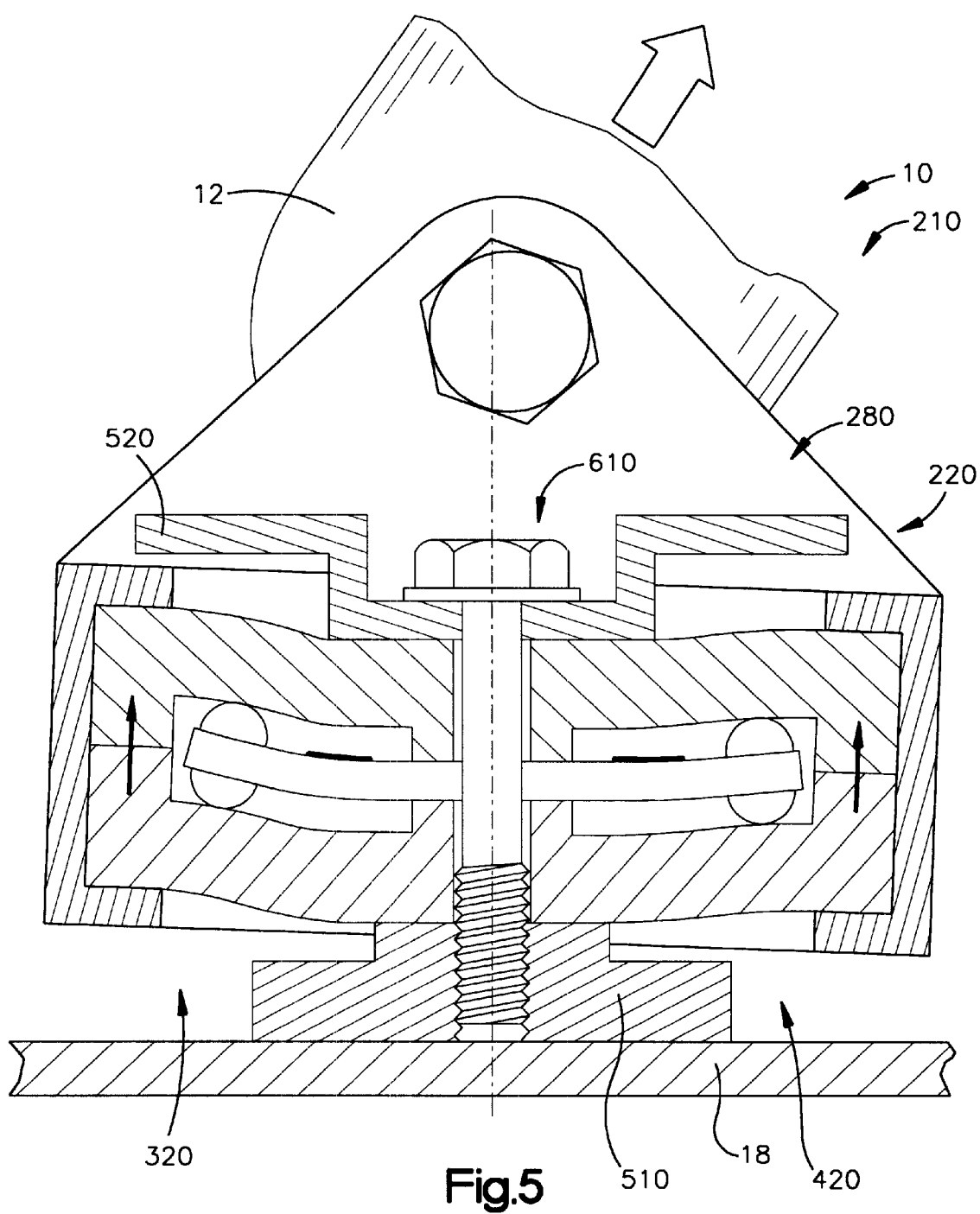
FIG. 5 is a schematic view of the apparatus of FIG. 2 under a different loaded condition.
Figure 6:
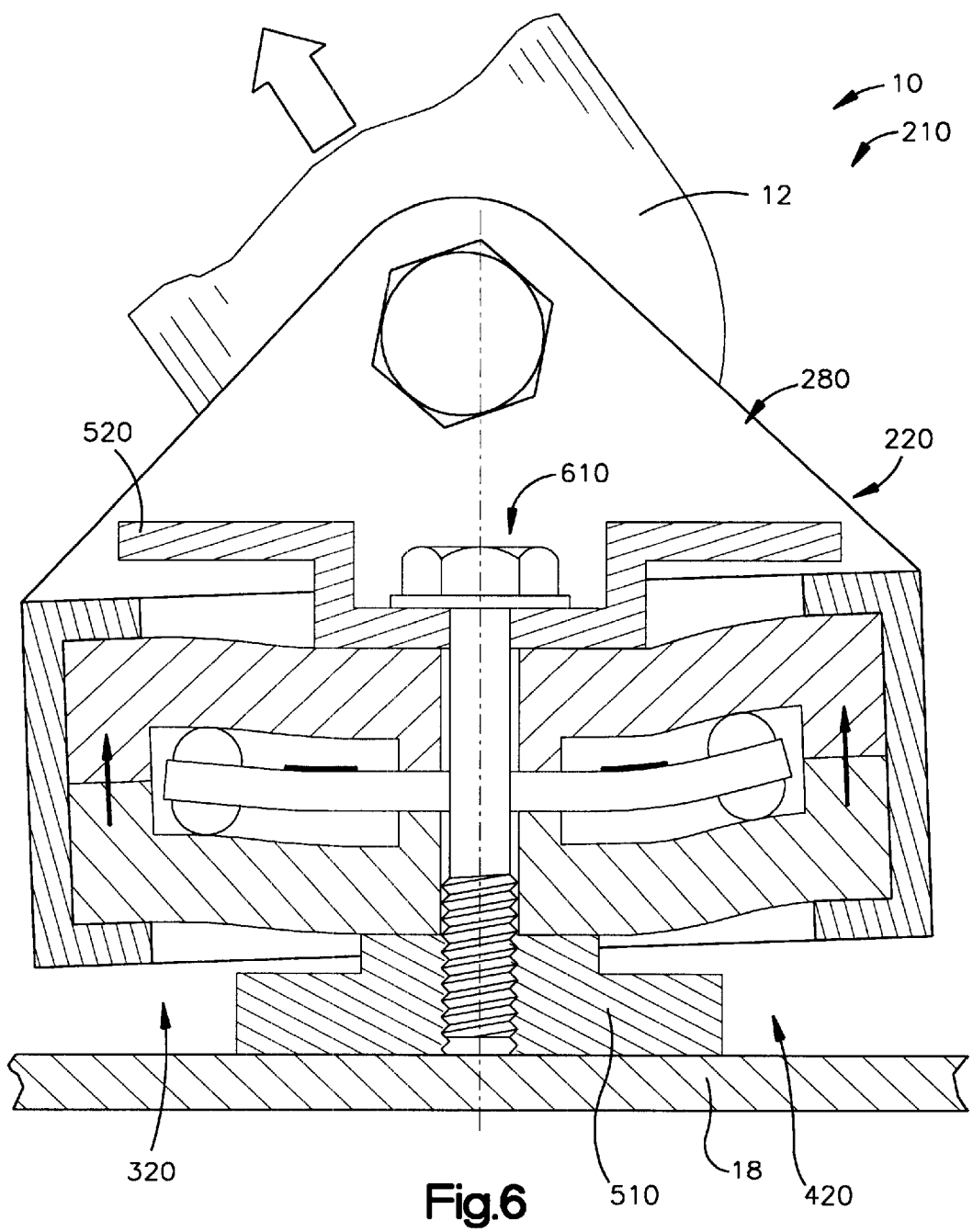
FIG. 6 is a schematic view of the apparatus of FIG. 2 under a still different loaded condition.

Any initial stresses incurred by the first and second sensors 379, 479 due to initial bending of the first and/or second sensor levers 370, 470 caused by manufacturing tolerances or assembly tolerances (i.e., tightening of the fastener, etc.) may be factored out during an initial calibration of the first and second sensors. The first and second sensor levers 370, 470 essentially bend only in a vertical plane about a horizontal axis (FIGS. 4–6). As stated earlier, torsional and lateral stresses are decoupled from the bending stresses by the upper and lower curved surfaces 375, 377, 475, 477 of the first end portions 372, 472 of the first and second sensor levers 370, 470. Because the seat belt webbing 12 generally imparts upward loads to the dual parallelogram linkage 220, the upper curved surfaces 375, 475 mainly provide stability to the first and second sensor levers 370, 470 and ensure that the first and second sensor levers 370, 470 return to their neutral positions (FIG. 3). The intermediate portions 355, 365, 455, 465 of the first, second, third, and fourth beams 352, 362, 452, 362, much thicker than the first and second sensor levers 370, 470, support loads created by the seat belt webbing 12 and transmit these loads to the vehicle floor pan 19.

The first end portions 372, 472 of the first and second sensor levers 370, 470 may thereby pivot, or rotate, slightly as the first end portions 372, 472 are forced upward by the intermediate portions 365, 465 of the second and fourth beams 362, 462. As viewed in FIGS. 4–6, the first, second, third, and fourth beams 352, 362, 452, 462 are forced into the "S" shapes while the first and second sensor levers 370, 470 are bent upward as simple cantilevers.

The first and second sensors 379, 479 produce output signals directly proportional to the vertical force applied to the seat belt webbing 12. Overloading of the first and second sensors 379, 479 is prevented by the lower surfaces 531, 532 of the first and second end portions 521, 522 of the restriction plate 520, as discussed above. The first and second sensors 379, 479, while preferably strain gauge sensors, may be any suitable sensors.

From the above description of the invention, those skilled in the art will perceive improvements, changes and modifications. Such improvements, changes and modifications are intended to be included within the scope of the appended claims.

Having described the invention, the following is claimed:

1. An apparatus comprising:
   seat belt webbing for helping to protect an occupant of a vehicle;
   a first parallelogram linkage including a first beam and a second beam parallel to said first beam, said first and second beams each bending in response to at least part of a load applied by said seat belt webbing;
   a first sensor lever interposed between said first and second beams, said first sensor lever having a connection with said first and second beams, said connection causing said first sensor lever to deflect upon bending of said first and second beams; and a first sensor for sensing the deflection of said first sensor lever and providing a first output signal indicative of the amount bending of said first and second beams.

2. The apparatus as defined in claim 1 wherein said first and second beams each have adjacent interconnected first ends which receive at least part of the load from said seat belt webbing, said first and second beams each further having adjacent interconnected second ends, said second ends transmitting the part of the load to the vehicle.

3. The apparatus as defined in claim 2 further including a fastener assembly for securing said apparatus to the vehicle.

4. The apparatus as defined in claim 1 wherein said first sensor receives part of the load applied by said seat belt webbing, the output signal being combined with another output signal indicative of another part of the load applied by said seat belt webbing to produce an angle value indicative of the direction in which the load is applied by said seat belt webbing.

5. The apparatus as defined in claim 1 further including a second parallelogram linkage for sensing another part of the load applied by said seat belt webbing.

6. The apparatus as defined in claim 5 wherein said second parallelogram linkage comprises:

a third beam and a fourth beam parallel to said third beam, said third and fourth beams each bending in response to the other part of the load applied by said seat belt webbing;

a second sensor lever interposed between said third and fourth beams, said second sensor lever deflecting upon bending of said third and fourth beams; and a second sensor for sensing the deflection of said second sensor lever and providing a second output signal indicative of the amount of bending of said third an d fourth beams, the second output signal being combined with the first output signal to produce an angle value indicative of the direction in which the load is applied to said apparatus by said seat belt webbing and a tension value indicative of the magnitude of the vertical component of force applied to said apparatus by said seat belt webbing.

7. The apparatus as defined in claim 6 wherein said third and fourth beams each have adjacent interconnected first ends which receive the other part of the load from said seat belt webbing, said third and fourth beams each further having adjacent interconnected second ends, said second ends transmitting the other part of the load to the vehicle.

8. The apparatus as defined in claim 7 wherein said seconds ends of said first and second beams are adjacently interconnected with said second ends of said third and fourth beams.

9. The apparatus as defined in claim 1 wherein said first sensor lever includes a first curved surface engaging a lower surface of said first beam and a second curved surface engaging an upper surface of said second beam.

10. The apparatus as defined in claim 9 wherein said first and second curved surfaces allow pivoting of one end portion of said first sensor lever as said first sensor lever is deflected by at least one of said first and second beams.

11. The apparatus as defined in claim 1 further including a plate member with a surface defining a travel stop, said surface limiting movement of said first ends of said first and second beams as said first and second beams bend.

12. The apparatus as defined in claim 11 further including a housing for restricting said first ends of said first and second beams from pivoting relative to said housing.

13. The apparatus as defined in claim 1 wherein said first sensor lever has a longitudinal axis, said first beam and said second beam each being disposed equidistantly from said longitudinal axis when said first and second beams are in an unloaded condition.

14. An apparatus comprising:

seat belt webbing for helping to protect an occupant of a vehicle; and a dual parallelogram linkage, said dual parallelogram linkage comprising:

a first beam and a second beam parallel to said first beam, said first and second beams each having adjacent interconnected first ends which receive a first component of a load from said seat belt webbing, said first and second beams each having adjacent interconnected second ends which receive a second component of the load from said seat belt webbing, said first and second beams each further having adjacent interconnected middle portions, said middle portions transmitting the first and second components of the load to the vehicle, said first and second beams each bending in response to the load from said seat belt webbing;

a sensor lever interposed between said first and second beams, said sensor lever having a first connection with said first and second beams, said sensor lever further having a second connection with said first and second beams, said first connection causing a first part of said sensor lever to deflect upon bending of said first and second beams, said second connection causing a second part of said sensor lever to deflect upon bending of said first and second beams;

a first sensor for sensing the deflection of said first part of said sensor lever and providing a first output signal indicative of the amount bending of said first and second beams by the first component of the load; and a second sensor for sensing the deflection of said second part of said sensor lever and providing a second output signal indicative of the amount bending of said first and second beams by the second component of the load.

* * * * *